Jan. 31, 1967  G. H. LYSSY  3,301,043
METHOD AND MEANS FOR THE EXPERIMENTAL DETERMINATION
OF THE PERMEABILITY OF FOILS TO GAS
Filed April 16, 1964  2 Sheets-Sheet 2
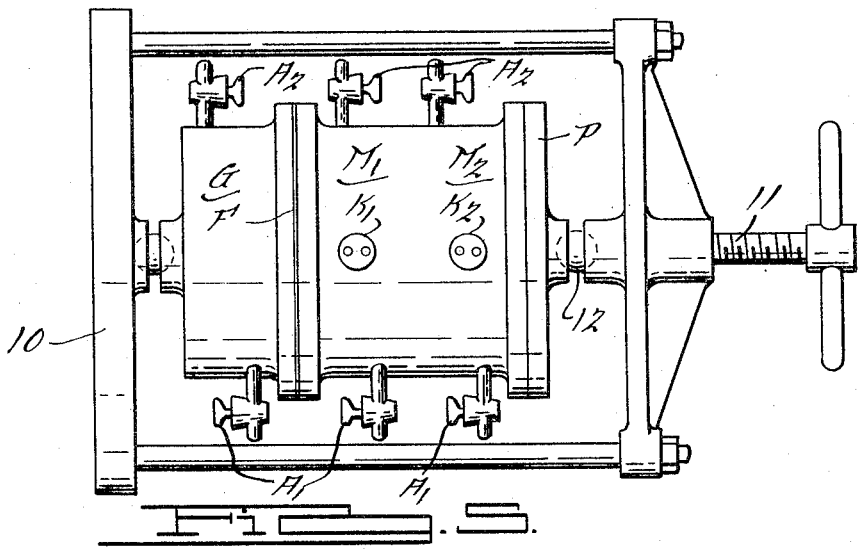
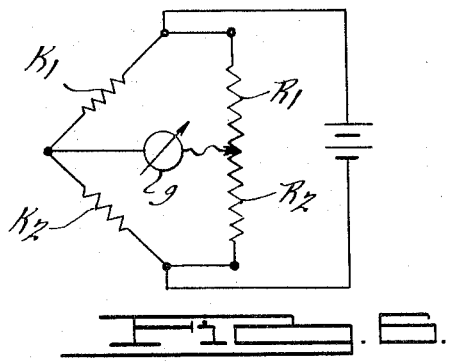
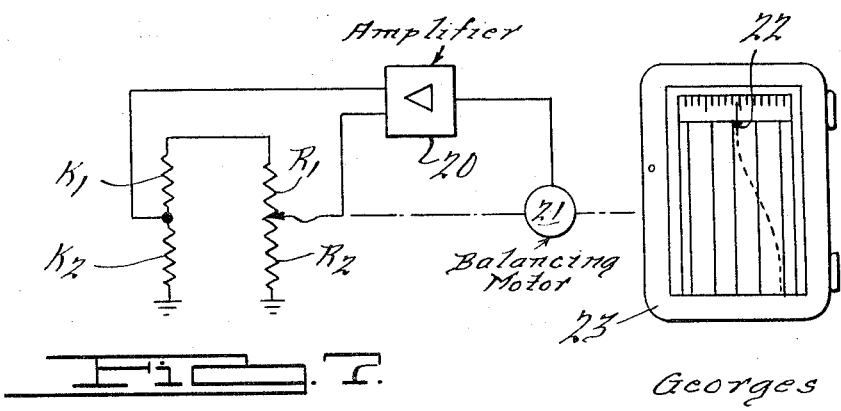
INVENTOR.
Georges H. Lyssy
BY
Harness, Dickey & Pierce
ATTORNEYS.

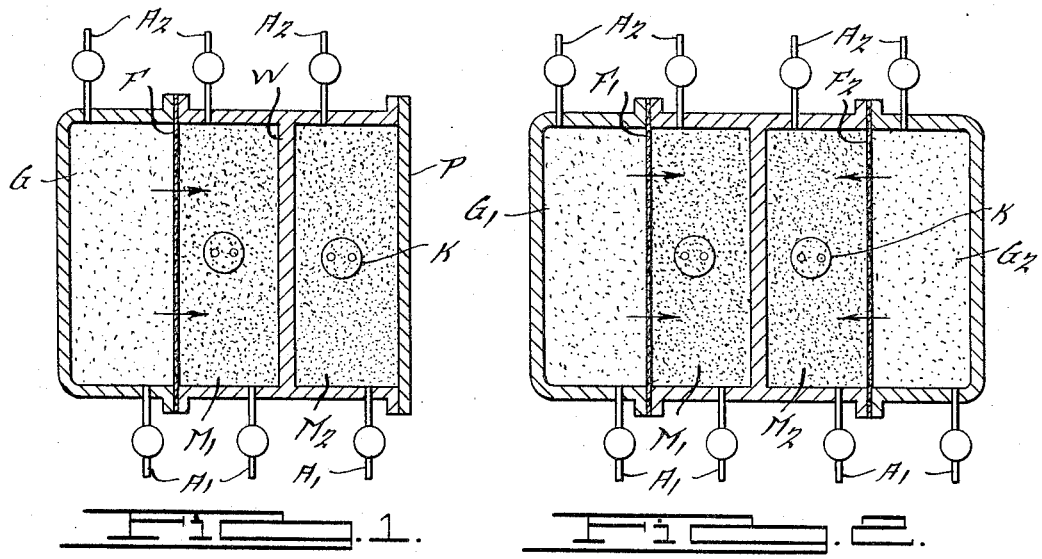
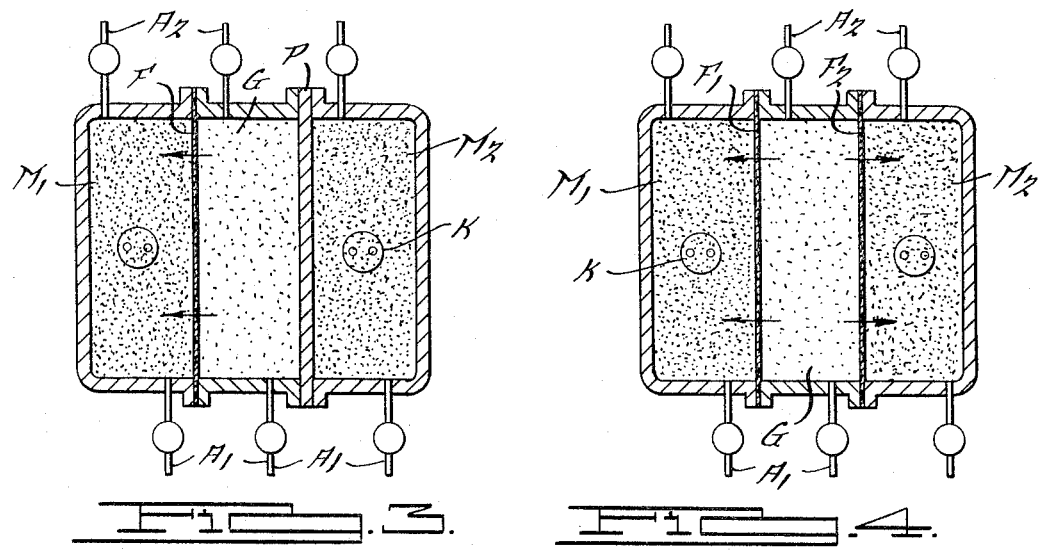

United States Patent Office 3,301,043
Patented Jan. 31, 1967

3,301,043
METHOD AND MEANS FOR THE EXPERIMENTAL DETERMINATION OF THE PERMEABILITY OF FOILS TO GAS
Georges H. Lyssy, Zollikon, Switzerland, assignor to Hans Sickinger Co., West Bloomfield Township, Mich., a corporation of Michigan
Filed Apr. 16, 1964, Ser. No. 360,309
Claims priority, application Switzerland, May 9, 1963, 5,933/63
3 Claims. (Cl. 73—38)

The present invention concerns a method of determining by experiment the permeability of foils to a test gas. The permeability to gas is of particular importance where foils are concerned which are intended to serve as packing material.

In the former methods, the permeability to gas was determined by manometric methodology in that an underpressure was created within a space enclosed by the foil to be tested, which underpressure was slowly compensated by the permeability of the foil to gas. With such a method, a differential pressure was thus always required across the foil to be tested; the measurements generally took considerable time and in addition to that were based on unrealistic conditions since with packaged goods the pressure existing on both sides of the foil is usually equal.

It is an object of this invention to provide a more exact measuring method for determining the permeability of foils to gas in which measurements are taken with the pressure on both sides of the foil being equal. Moreover, the measurement can be carried out within a relatively short space of time, thus considerably reducing the influence of marginal interferences (gas transfer at the margins of the foil).

Briefly, under the present invention, two experiment chambers which in a thermal respect are substantially equivalent are each provided with a thermal conductivity measuring element, at least one such chamber being provided with a wall formed of the foil to be tested, both chambers being filled with a reference gas which differs from the test gas. The test gas is allowed to act upon the outside of the wall formed by the foil. Then the differential thermal conductivity of the gases contained in the two experiment chambers is measured either continuously or at regular intervals with the aid of thermal conductivity measuring elements, the difference of thermal conductivity being caused by test gas diffused into at least one of the two experiment chambers.

It is another object of this invention to provide an apparatus designed to carry out the said method, which apparatus comprises not less than two measuring chambers, each containing one thermal conductivity measuring element and sealable connections for the supply and discharge of gas, each chamber being provided with not less than one open side equipped with a sealing flange.

The new method utilizes the physical knowledge that the thermal conductivity of a pure gas differs from the thermal conductivity of a gas which is contaminated with another gas. A quick and accurate measurement is conditional on the proper selection of a reference gas of different thermal conductivity to suit the test gas.

To measure the thermal conductivity of the gas, thermal conductivity measuring elements, such as katharometers or semiconductor elements (thermistors NTC, PTC), are used. The arrangement is such that two substantially equal thermal conductivity measuring elements are incorporated in a bridge connection fed from a substantially constant voltage source, the standard resistances always being adjusted so that the voltage in the measuring arm always equals zero. Measurements may however be taken also direct, i.e. without balancing. This results in a very sensitive measurement of the resistance variation of the thermal conductivity measuring elements, where any interferences from the environment, such as variations in atmospheric pressure and/or temperature, will not impair the accuracy of measurement since they are compensated. Such a measuring method is known in gas chromatography; its application to the present invention, however, is novel.

The measuring method using thermal conductivity measuring elements is briefly illustrated as follows: Such an element is, roughly, an electrically heated resistance. The temperature reached by the element during the passage of current depends on the quantity of heat which it can by radiation and convection emit to the environment, in particular therefore on the thermal conductivity of the gas surrounding the element. If the thermal conductivity of the gas diminishes as a result of contamination with another gas, the temperature of the measuring element will rise. If katharometers are used as measuring elements, their electric resistance also rises. (However, if NTC resistances were used, the electric resistance would fall.) The resistance variation of the compensation resistances required to balance the measuring bridge may thus be taken to indicate the degree of impurity of the gas and also the permeability of the foil to gas. If the said variations are measured either continuously or at certain time intervals and if the measuring values are plotted in the form of a curve $R=f(Z)$, this curve will represent a rating of the permeability of the foil to gas.

The drawings illustrate the experiment chambers exemplifying an embodiment of the invention, which may serve to describe the measuring method in detail.

FIGURES 1 through 4 are schematic views showing several sets of chambers;

FIGURE 5 shows one embodiment of a set of chambers illustrated in FIGURE 1;

FIGURE 6 shows a bridge connection; and

FIGURE 7 shows a diagram of a self-balancing and recording measuring bridge.

The sets of chambers shown in FIGURES 1 and 2 each contain two thermal conductivity measuring elements K and two sealable gas connections $A_1$, $A_2$ arranged in the experiment chambers $M_1$, $M_2$ which are combined to form one unit, the said chambers being separated from each other by wall W which is impervious to gas. The real experiment chambers $M_1$, $M_2$ are filled with a reference gas shown by the closely dotted areas.

In FIGURE 1 the right-hand experiment chamber $M_2$ is sealed gas-tight by means of a cover plate P, the left-hand experiment chamber $M_1$ being separated from a gas chamber G which is filled with test gas (shown by the widely dotted area), by a foil F which is to be tested. With the aid of such a set of chambers, a foil can be tested as to its permeability to gas.

The set of chambers shown in FIGURE 2 is designed to determine the relative permeability to gas by enabling the permeability to gas of the two foils $F_1$ and $F_2$ to be compared. Instead of sealing the right-hand experiment chamber $M_2$ with a cover plate, a foil $F_2$ and a chamber $G_2$ filled with test gas are provided on this side.

FIGURES 3 and 4 show sets of gas chambers with two separated experiment chambers $M_1$, $M_2$ each containing one katharometer K. The arrangement shown in FIGURE 3 is designed to determine the absolute permeability of foil F to gas. Between chamber G which is filled with test gas and experiment chamber $M_2$ there is a wall P which is impervious to gas.

In the set of chambers shown in FIGURE 4, this wall is replaced by foil $F_2$ whose permeability is to be compared with that of foil $F_1$.

The arrows in these figures indicate the flow direction of the test gas permeating through the foil. The valves symbolically shown in the connections $A_1$, $A_2$ are used to fill the various chambers with test gas or reference gas, respectively. FIGURE 5 describes these processes in greater detail, showing the embodiment of a set of chambers corresponding with FIGURE 1. The complete set of chambers $M_1$, $M_2$, G is arranged within a press 10 to be compressed by means of screw 11. In the bottom of chamber G and in the cover plate P, centrally arranged recesses are provided to accommodate balls 12 which are designed to transmit the compressive force of the screw uniformly onto the flanges. This is important particularly to the flanges between which the test foil F has been clamped, because an unevenly distributed pressure might possibly crush the foil. The flanges must be perfectly plane and tight. In case of need, additional sealing may be produced by means of a layer of grease or of a rubber ring of round section (O-ring) mounted in an annular groove.

Before measuring, the experiment chambers $M_1$, $M_2$ are filled with reference gas and the gas chamber G with test gas. This is done by rinsing the chambers, with both valves $A_1$, $A_2$ being open, for a prolonged period. Subsequently, all valves are closed, and the measuring process begins. Although reference is made to gases in this description, either the test gas or the reference gas may be a gas mixture, for instance air. If the permeability of a foil to oxygen is to be tested, nitrogen may be used as a reference gas, but helium as a reference gas will yield a much higher sensitivity. The electrical connections for the thermal conductivity measuring elements (katharometers) are passed gas-tight through the wall of the experiment chamber. Instead of using katharometers provided with a heating coil, thermistors may be used. Thermistors increase the accuracy of measurement because they react much more strongly to variations in thermal conductivity (or temperature), so that the duration of the test may be abbreviated.

During the measuring process, the katharometer (or the semi-conductor element), which represents a heat source, will cause the gas contained in the experiment chambers to circulate and mix continuously. Owing to the test gas being diffused into the experiment chamber $M_1$ filled with reference gas, there is a risk that the pressure of the gas in chamber $M_1$ may differ from that contained in experiment chamber $M_2$. At the beginning of the measurement, the pressure in both chambers was largely equalized by filling against the atmospheric pressure. In the embodiment having two adjacent experiment chambers shown in FIGURE 5, the partition wall is provided with a capillary bore designed to equalize the pressure in a simple manner.

All chambers being equipped with connections, the pressure in the two experiment chambers may be checked and, in case of need, balanced, by other means, for instance with a hose and capillary glass tubes which are sealed with a tiny drop of mercury. The arrangement shown in FIGURE 5 permits also the provision of a slight overpressure in the test gas against the reference gas or, where necessary, degassing of the test sample by vacuum.

The permeability to gas is measured electrically on the principle illustrated by the diagram of FIGURE 6. The katharometers $K_1$, $K_2$ and the resistances $R_1$, $R_2$ are arranged in parallel branches of a bridge connection. If galvanometer $g$ is currentless, the resistances $K_1/K_2$ will behave like $R_1/R_2$. If the thermal conductivity of the gas contained in chamber $M_1$ changes, this will change the temperature of katharometer $K_1$ and thereby its resistance. A balance performed, after a certain time interval, in the bridge thus gives a rating of the gas permeation through the test foil.

As such measurements will often extend over longer periods of time, for instance 24 hours, it is an advantage to use a bridge equipped with automatic balancing and recording of the test values, as is illustrated in the diagram of FIGURE 7. Such an apparatus is known and will therefore be described only briefly. The small voltage variation produced by the resistance variation of a katharometer $K_1$ in the bridge connection $K_1$, $K_2$–$R_1$, $R_2$ is amplified in an amplifier 20 and conveyed to a balancing motor 21 which continuously balances the bridge. The adjusting motion of the motor also causes the recording pen 22 of a recorder 23 to be shifted. In this manner, the resistance variation is constantly recorded.

The curve thus plotted represents a resistance variation which can easily be translated into the percentage contamination of the reference gas. The surface of the foil and the volume of the chamber being known, the percentage contamination of the reference gas can be expressed in terms of permeability of the foil, for instance in grams per square meter and per 24 hours.

In the comparative measurement of two foils (as in FIGURE 2 or FIGURE 4), the measurement is confined to the greater degree of contamination of the reference gas in experiment chamber $M_1$ relative to that in the other experiment chamber $M_2$.

In conclusion it may be emphasized that by the method described above and with the aid of the apparatus described above foils can be tested also as to their permeability to vapors if these are ideal vapors that behave like a gas and will not condense at the temperature and pressure existing in the measuring process. As the measurement represents a sensitive heat measurement, the slightest condensation of the vapor would impair the results of measurement. A condensation of the thermal conductivity measuring elements would, in particular, form a heat insulating or heat conducting layer which would nullify any exact measurement. However, if this is not the case, the permeability of a foil to a vapor, a mixture of vapor and gas or a mixture of vapors can easily be measured.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a method for experimentally determining the relative permeability of two foils to a test gas, the steps of providing two chambers which are thermally substantially equivalent, using a first of said foils to form a wall of one of said chambers and the second foil to form a wall of the other chamber, filling both chambers with a reference gas, permitting a test gas differing from said reference gas to act against the outsides of both foils, and measuring the difference in thermal conductivities of the reference gases in said two chambers caused by the difference in rates of diffusion of said test gas through said two foils.

2. In a device for experimentally determining the permeability of foils to a test gas, first and second reference gas chambers provided with thermal conductivity measuring elements, first and second test gas chambers, means for mounting a first foil to be tested between one of said test gas chambers and one of said reference gas chambers, means for mounting a second foil to be tested so as to form a wall between the second test gas chamber and the second reference gas chamber, and valve means for supplying and discharging gases from said chambers whereby said thermal conductivity measuring elements will measure the difference in thermal conductivity of said two reference gas chambers caused by diffusion of said test gas through said foils.

3. In a device for experimentally determining the permeability of foils to a test gas, first and second reference gas chambers provided with thermal conductivity measuring elements, at least one test gas chamber disposed between said two reference gas chambers, means for mounting a first foil to be tested between said test gas chamber and one of said reference gas chambers, means for mounting a second foil to be tested so as to form a wall between said test gas chamber and said other reference gas chamber, and valve means for supplying and discharging gases from said chambers whereby said thermal conductivity measuring elements will measure the difference in thermal conductivity of said two reference gas chambers caused by diffusion of said test gas through said foils.

References Cited by the Examiner
UNITED STATES PATENTS

| | | | |
|---|---|---|---|
| 1,304,208 | 5/1919 | Shakespear | 73—38 X |
| 2,792,542 | 5/1957 | Robinson. | |
| 3,097,518 | 6/1963 | Taylor et al. | 73—27 X |

OTHER REFERENCES

Notely, Journal Applied Chem., vol. 13, No. 3, March 1963, pages 107–111.

LOUIS R. PRINCE, *Primary Examiner.*

S. C. SWISHER, *Assistant Examiner.*